Aug. 29, 1961 ZEN-ITI KIYASU ET AL 2,998,531

SWITCHING SYSTEM OF BINARY PHASE SIGNAL

Filed Aug. 28, 1956 3 Sheets-Sheet 2

United States Patent Office 2,998,531
Patented Aug. 29, 1961

2,998,531

SWITCHING SYSTEM OF BINARY PHASE SIGNAL

Zen-Iti Kiyasu and Saburo Muroga, Tokyo, Japan, assignors to Nippon Telegraph and Telephone Public Corporation, Tokyo, Japan, a corporation of Japan Filed Aug. 28, 1956, Ser. No. 606,641
2 Claims. (Cl. 307—88)

This invention relates to magnetic devices and more particularly to switching devices for carrying on switching functions on signals having binary information.

If a resonant circuit of a resonator which contains a non-linear element is excited by an alternating current having twice its resonance frequency, and where consequently the value of non-linear elements is varied, an oscillation wave of the resonance frequency is generated. The oscillation wave can take either one of two phases which differ from each other by $\pi$ radians. Therefore, when these two phases are representative of 0 radians or $\pi$ radians respectively, the oscillation wave whose phase is 0 radians, can be obtained if a resonance wave of a minute amplitude, which is confined within $$0\pm\frac{\pi}{2}$$

radians in its phase, is impressed as a control wave to the excitation element of this parametrically excited resonator. And then, if the phase is limited within $$\pi\pm\frac{\pi}{2}$$

radians, a $\pi$ radians oscillation wave will be produced. Utilizing this characteristic of resonators electric logical computers or exchange devices for telephone and telegraph systems can be constructed.

A principal object of this invention is to produce a switching device which can start and stop alternatively a waveform which takes two phases differing from each other by $\pi$ radians and each phase is representative of a binary condition.

Another object of this invention is to produce a switching device which is fast and does not use as much reactive power as a mechanical relay or an electron tube.

Still another object of this invention is to provide a switching device which is remarkably reliable and can work stably for long periods of time.

In order to accomplish the above mentioned purposes or objects in this invention a saturated magnetic flux is generated by adding a direct current bias magnetic field to a magnetic core which has an input winding and an output winding formed thereon. And then, when a control wave which has the frequency related to an input signal in an even ratio with that of the input signal, and whose instantaneous maximum or peak values occur at the same time with the peaks of the input signal being switched the above mentioned magnetic cores are excited and the input winding and output winding thereon are inductively coupled.

In order that the invention may be more clearly understood and readily carried out the same will now be described more fully with reference to the accompanying drawings, in which, FIG. 1 is a schematic diagram of an embodiment of the present invention;

Figure 1:
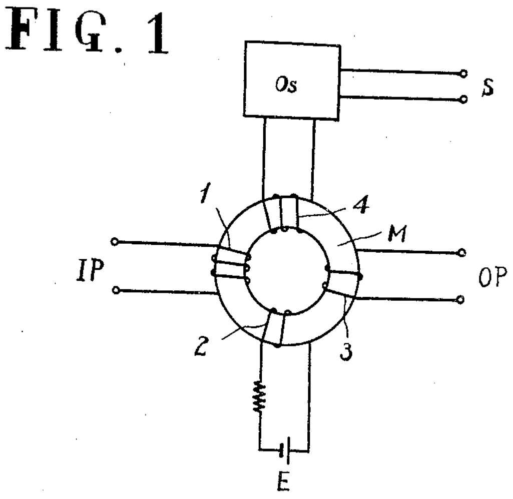

In FIG. 1, a toroidal magnetic core M which has wound thereon four coils 1, 2, 3 and 4 is shown. An input signal of a given frequency, which is to be switched is impressed on the terminals IP of coil 1, and an output wave is taken out from terminals OP. A direct current of proper magnitude is applied to coil 2 from a direct current souce E. A current of a frequency $2f$ is impressed on coil 4 from an oscillator $O_s$ which works or stops by the application of a control signal which is impressed at terminals $s$.

Figure 2:
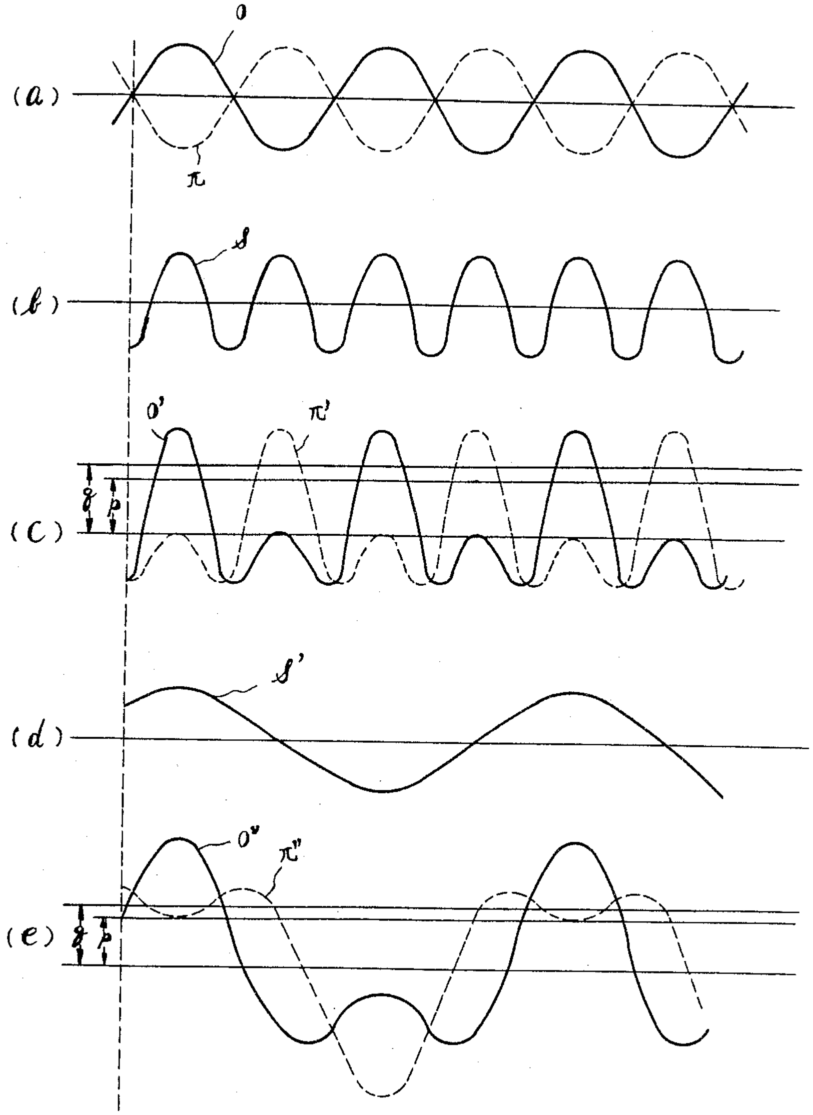
FIG. 2 is a waveform diagram illustrative of currents and fluctuating magnetic fields of the present invention.

The input signal to be switched, applied to the input terminals IP is assumed to be either one of two phases of a sinusoidal waveform having either an 0 phase or a $\pi$ phase differing from each other by $\pi$ radians shown in FIG. 2($a$). It being understood the opposite phases are representative of binary digits "0" and "1." On the other hand, the phase of the sinusoidal control signal of $2f$ frequency is assumed to have its maximum values or peaks at the corresponding points where the amplitude of the signal being switched is at a maximum or zero, as shown by the waveform $s$ in FIG. 2($b$). When a control signal is applied to the oscillator and the input signal takes the phase shown by waveform O in FIG. 2($a$), a magnetic field represented by the solid line O′ in FIG. 2($c$) is produced in the core M in FIG. 1. Where the input signal has the opposite phase shown by waveform $\pi$ in FIG. 2($a$), a magnetic field shown by a dotted line $\pi'$ is produced. Without the application of a control waveform from the oscillator $O_s$, only a sinusoidal magnetic field which corresponds to waveform O or $\pi$ in FIG. 2($a$) and has a smaller amplitude than the previous case, is produced in the core M. This peak value of field intensity will be denoted by $p$ as shown in FIG. 2($c$). A proper field intensity which is a little larger than $p$ and is smaller in peak value than the field O′ or $\pi'$ will be denoted by $q$.

Figure 3:
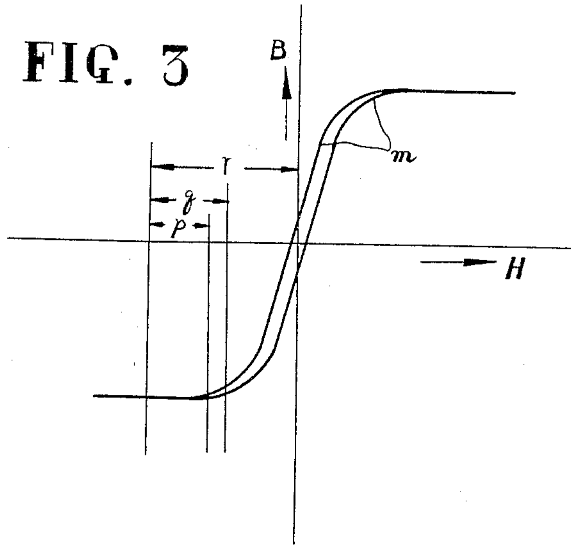
FIG. 3 is a characteristic curve illustrating the relation between the field intensity and magnetic flux density in a core.

If the relation of the magnetic field intensity H with the magnetic flux B in the magnetic core M is expressed by the curve $m$ in FIG. 3, the direct bias current of the coil 2 produces such a magnetic field $r$ that saturates the core fully. As shown in the figure, the value of the magnetic field intensity $(r-q)$ almost saturates the core and the field direction is contrary to that of a larger magnetic field of waveform O′ or $\pi'$ which is shown in FIG. 2($c$). Therefore, when the control waveform of the frequency $2f$ is not impressed to the coil 4, a fluctuating field, which is caused only by the signal wave O or $\pi$, is produced in the magnetic core M, but its range of fluctuation is in the saturated part of the magnetic flux density curve of FIG. 3 which is larger than $(r-q)$. So a voltage is not induced in the coil 3. Therefore, the input signal impressed on the input terminals IP is cutoff with this device. But if the control signal of the frequency $2f$ is delivered from the oscillator $O_s$ to the coil 4 by the switching signal which is impressed to terminal S, the fluctuating field O′ or $\pi'$ in FIG. 2($c$) is generated in the core M according to whether the phase of the input signal is 0 or $\pi$, as shown in FIG. 2($a$).

The intensity of the peak of this fluctuating field is larger than $q$, so it takes its place on the inclined part of the curve as shown in FIG. 3 and it is able to generate an inductive current in the coil 3. And this inductive current is the waveform which corresponds to the peaks of fluctuating field O' or $\pi'$ which is beyond field intensity $q$, and the two phases which it can take differ from each other by $\pi$ radians according to the input signal wave which is impressed upon the input terminal IP, that is, whether the phase of the input is 0 or $\pi$. Therefore, an output signal which corresponds in phase to the input signal is taken out from terminals OP, and if this output signal is delivered to a filter or a resonant circuit with a center frequency $f$, or a "parametron," it can be corrected into the sine wave in case of necessity.

The above mentioned explanation applies in case the frequency of the control signal or waveform impressed upon the coil 4 is assumed to have a frequency twice the frequency of the input signal to be controlled, that is $2f$. Even though the frequency is multiplied by even numbers $4f$, $6f$, $8f$ etc., or it is multiplied by even numbers $\frac{1}{2}f$, $\frac{1}{4}f$, $\frac{1}{6}f$ etc., the input signal can be switched on and off according to the same principle. For instance, if the frequency is $\frac{1}{2}f$, as shown in FIG. 2($d$), and then if the frequency is $\frac{1}{2}f$, and the control signal has such a phase that its maximum amplitude at the point of the maximum amplitude of input signal in figure ($a$), is impressed, then as the input signal becomes 0 or $\pi$, the magnetic field shown by a solid line O'' or by a dotted line $\pi'$ in the FIGURE 2($c$) is produced in the magnetic core M. Therefore if the value of the direct bias current is chosen, so that the magnetic field $r$ caused by this current and the value of $p$ and $q$ shown in FIG. 2($c$) may satisfy the relation in FIG. 3, the output current corresponding to the fluctuating part which goes beyond the magnetic field intensity $q$ can be taken out at the output terminals OP, only when the control signal of a frequency $f/2$ is impressed on coil 4. Thus, the two phases of the second harmonic wave of this output waveform, that is, the component of the frequency $f$, differ by $\pi$ radian according to the input signal wave at the input terminal IP.

As mentioned above, the binary information switching device of this invention consists of a magnetic core with input, output, control and biasing windings, wherein coupling between the input and output windings is normally cut-off by saturation of the core by using a direct current bias and wherein an output voltage corresponding to the non-saturating part of the input signal or current is generated, if and only if a control signal with a frequency which is an even harmonic or an even subharmonic of the input signal and whose maximum values or peaks occur at the time of the maximum values or peaks of the input signal which is applied to the core.

Therefore, in this invention, delay in the switching function and consumption of reactive power, encountered in mechanical relays or electron tubes, are not encountered. Furthermore, the device works stably for a long time, and the control waveform can be generated quite easily since its frequency has a relation with the input signal by an even number ratio. Thus especially, if the invention is applied to an electric computer which uses parametrons it can be made to work with ease and stability.

Moreover, any ferromagnetic core element which has non-linear characteristics as in FIG. 3, can be utilized as one of the structural elements of this invention. For instance, an element where a pair of electrodes are provided on titanic barium oxide and wires are connected to the electrodes, can be utilized in this invention.

Figure 4:
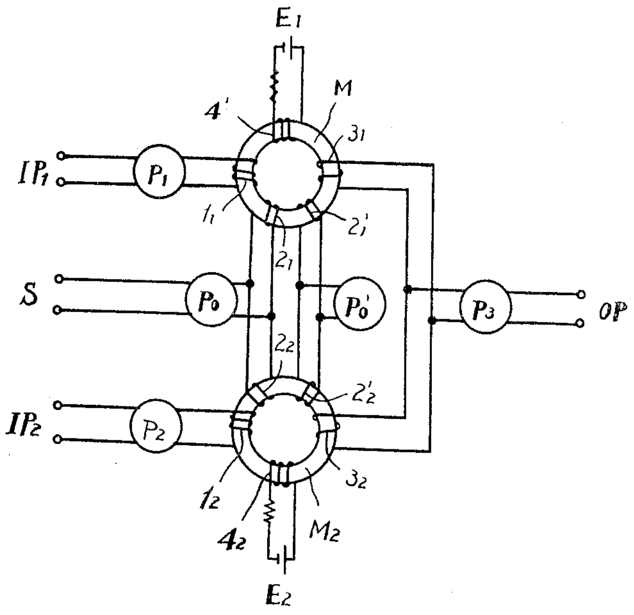
FIG. 4 is a schematic diagram of an application of the system, according to the invention, to a circuit of parametrically excited resonators.

FIG. 4 shows a schematic diagram of an embodiment of this invention in which the device of this invention is combined with "parametrons." According to the switching signal impressed on input terminals S, a parametron $P_3$ is coupled to either of input parametrons $P_1$ or $P_2$. Two parametrons $P_0$ and $P'_0$ provide the control signal. Two signals each of which has a frequency $f$ and have either of two phases which differ from each other by $\pi$ radians are impressed at input terminals $IP_1$ and $IP_2$ and they control the phases of the oscillation voltages in the parametrons $P_1$ and $P_2$, respectively. The outputs of these parametrons are coupled to input windings $1_1$ and $1_2$ of the magnetic cores $M_1$ and $M_2$ in the switching device. A direct current bias is supplied biasing windings $4_1$ and $4_2$ from direct current sources $E_1$ and $E_2$ in proper polarity and output windings $3_1$ and $3_2$ are coupled in parallel to the control terminal of the parametron $P_3$.

Here the resonance frequency of the parametrons $P_1$, $P_2$ and $P_3$, is equal to $f$. Moreover, the control signals supplied from the control parametrons $P_0$ and $P'_0$ should have frequencies which are both the same even harmonics or even subharmonics of $f$, but now assumed as the second harmonic of $f$. By taking one of the phases, which differ from each other by $\pi$ radians, these signals couple either of parametrons $P_1$ or $P_2$ to the parametron $P_3$. The frequency of the oscillation in the parametron $P_0$ whose oscillating wave has its phase controlled as the above control signal and that of the parametron $P'_0$ has almost the same amplitude as $P_0$ and always oscillates with a constant phase of the oscillation in the parametron $P'_0$ which is either one of two phases. The coils $2_1$ and $2'_1$ are wound in the same direction on the core $M_1$ and coils $2_2$ and $2'_2$ in the opposite direction on the core $M_2$. Thus the fluctuating magnetic field which exceeds the saturation point on the curve is induced in either of the magnetic cores $M_1$ and $M_2$ according to the phase of the voltage in the parametron $P_0$. Therefore, according to the switching signal applied to the terminal S, either of the outputs of the parametron $P_1$ through the core $M_1$ or that of the parametron $P_2$ through the core $M_2$ are optionally coupled to the parametron $P_3$.

What we claim is:

1. A switching device comprising, in combination, a non-linear magnetic core element, an input winding receptive of a sinusoidal signal having one of two opposite phases respectively representative of binary conditions "1" and "0" and having turns developed on said core for applying said input signal to said core, an output winding having turns developed on said core, a control winding having turns developed on said core, means for selectively applying to said control winding a sinusoidal control signal alternatively having an even harmonic or an even subharmonic of the input signal for controllably electromagnetically coupling said input and output windings to induce in said output winding an output signal having at least a phase corresponding to the phase of the input signal, and means comprising a winding having turns developed on said core for applying a unidirectional current cut-off bias drive to said core to saturate it to a preselected saturation level and a preselected polarity so chosen to allow electromagnetic induction of said output signal in said output winding only if the peak values of the sinusoidal input and control signals occur at the same time and in the same sense.

2. A switching device comprising, in combination, a pair of non-linear magnetic core elements, for each core an input winding receptive of a sinusoidal signal having one of two opposite phases respectively representative of binary conditions "1" and "0" and having turns developed on a respective core for applying said input signal to said respective core, for each core an output winding having turns developed on said core, for each core a control winding having turns developed on said core, means for selectively applying to said control windings respectively a sinusoidal control signal alternatively having an even harmonic or an even subharmonic of the input signals for controllably electromagnetically coupling the corresponding input and output windings on the respective cores to induce in said output windings an output signal having at least a phase corresponding to the phase of the corresponding input signal, and means comprising a winding having turns developed on respective ones of said cores for applying a unidirectional current cut-off bias drive to said respective cores to saturate them respectively to a preselected saturation level and a preselected polarity so chosen to allow electromagnetic induction of respective output signals in said output windings only if the peak values of the corresponding sinusoidal input and control signals occur at the same time.

References Cited in the file of this patent

UNITED STATES PATENTS

| | | |
|---|---|---|
| 2,519,425 | Barlow | Aug. 22, 1950 |
| 2,666,151 | Rajchman et al. | Jan. 12, 1954 |
| 2,734,184 | Rajchman | Feb. 7, 1956 |
| 2,741,757 | Devol et al. | Apr. 10, 1956 |
| 2,813,260 | Kaplan | Nov. 12, 1957 |
| 2,886,801 | Briggs | May 12, 1959 |